(12) United States Patent
Cosimi

(10) Patent No.: US 7,834,318 B1
(45) Date of Patent: Nov. 16, 2010

(54) INFRARED VEHICLE MARKER

(76) Inventor: Cary D. Cosimi, 9301 Tournament Dr., Hudson, FL (US) 34667

( * ) Notice: Subject to any disclaimer, the term of this patent is extended or adjusted under 35 U.S.C. 154(b) by 358 days.

(21) Appl. No.: 12/104,112

(22) Filed: Apr. 16, 2008

(51) Int. Cl.
*G02F 1/01* (2006.01)
*G01J 5/00* (2006.01)

(52) U.S. Cl. .................................. 250/330; 250/338.1
(58) Field of Classification Search ................. 250/330, 250/336.1, 338.1, 339.01, 339.06, 504 R
See application file for complete search history.

(56) References Cited

U.S. PATENT DOCUMENTS

| | | | |
|---|---|---|---|
| 4,059,912 A | 11/1977 | Noah | |
| 5,065,032 A | 11/1991 | Prosser | |
| 5,396,243 A | 3/1995 | Jalink, Jr. et al. | |
| 5,444,262 A | 8/1995 | Campagnuolo et al. | |
| D440,192 S | 4/2001 | Sauter | |
| 7,666,682 B2 * | 2/2010 | Armentrout et al. | 436/56 |
| 2004/0065850 A1 | 4/2004 | Kane | |

* cited by examiner

*Primary Examiner*—David P Porta
*Assistant Examiner*—Faye Boosalis
(74) *Attorney, Agent, or Firm*—Crossley Patent Law; Mark A. Crossley

(57) ABSTRACT

An infrared vehicle marker that is designed for civilian and military use to identify a particular vehicle for friendly aircraft using forward-looking infrared (FLIR) vision equipment. Each marker used with the present invention is designed to be either a number, symbol or letter that is sized at least 22 inches in height and preferably is placed on the rear deck lid or roof of a public safety or military vehicle. Each marker has three layers made of a flexible laminate layer, a middle layer fabricated from a flexible, electrically resistant heating material, and a top layer fabricated from a reflective decal material that is also flexible in nature. The three layers are laminated together and are powered via a 12-volt direct current power connection.

12 Claims, 3 Drawing Sheets

INFRARED VEHICLE MARKER

BACKGROUND OF THE INVENTION

The present invention concerns that of a new and improved infrared vehicle marker system that is designed for civilian and military use to identify a particular vehicle for friendly aircraft using forward-looking infrared (FLIR) vision equipment.

SUMMARY OF THE INVENTION

The present invention concerns that of a new and improved infrared vehicle marker system that is designed for civilian and military use to identify a particular vehicle for friendly aircraft using forward-looking infrared (FLIR) vision equipment. Each marker used with the present invention is designed to be either a number, symbol or letter that may vary in shape and size, but is preferably at least 22 inches in height and preferably is placed on the rear deck lid or roof of a public safety or military vehicle. Each marker has three layers made of a flexible laminate layer, a middle layer fabricated from a flexible, electrically resistant heating material, and a top layer fabricated from a reflective decal material that is also flexible in nature. The three layers are laminated together and are powered via a 12-volt direct current power connection.

There has thus been outlined, rather broadly, the more important features of an infrared vehicle marker system that the detailed description thereof that follows may be better understood and in order that the present contribution to the art may be better appreciated. There are, of course, additional features of the infrared vehicle marker system that will be described hereinafter and which will form the subject matter of the claims appended hereto.

In this respect, before explaining at least one embodiment of the infrared vehicle marker system in detail, it is to be understood that the infrared vehicle marker system is not limited in its application to the details of construction and to the arrangements of the components set forth in the following description or illustrated in the drawings. The infrared vehicle marker system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the infrared vehicle marker system. It is important, therefore, that the claims be regarded as including such equivalent constructions insofar as they do not depart from the spirit and scope of the present invention.

It is therefore an object of the present invention to provide an infrared vehicle marker system which has all of the advantages of the prior art and none of the disadvantages.

It is another object of the present invention to provide an infrared vehicle marker system which may be easily and efficiently manufactured and marketed.

It is another object of the present invention to provide an infrared vehicle marker system which is of durable and reliable construction.

It is yet another object of the present invention to provide an infrared vehicle marker system which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
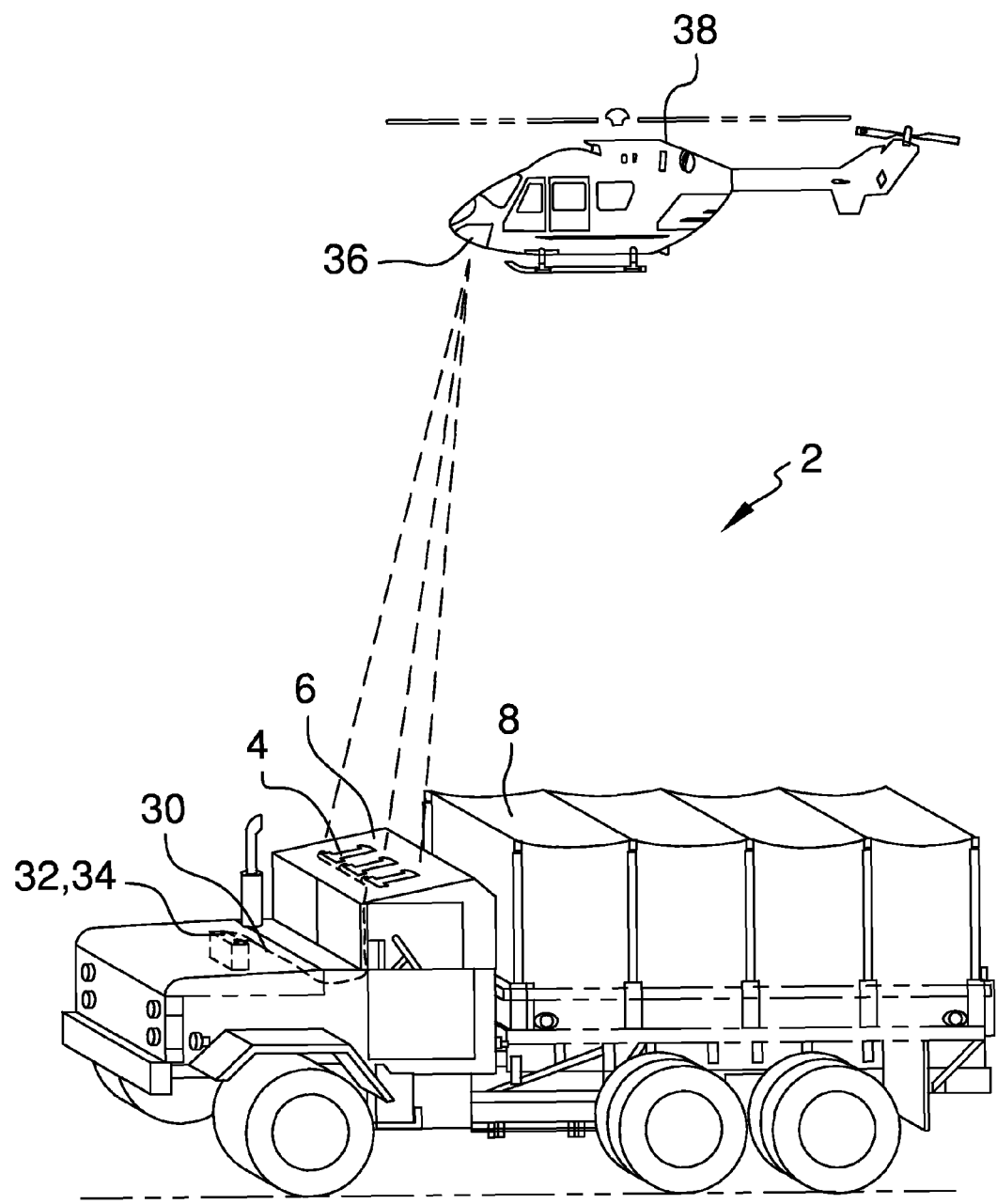
FIG. 1 shows a representational view showing an example of the infrared vehicle marker system as it would appear in use.
Figure 2:
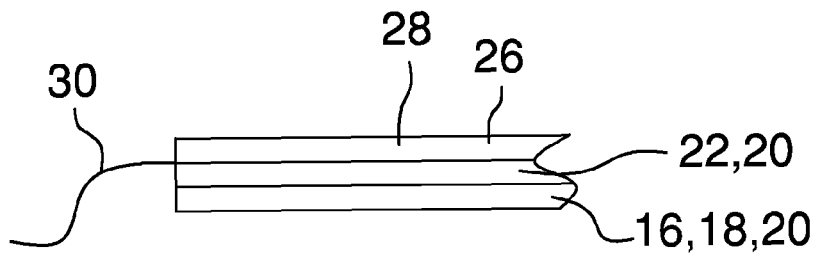
FIG. 2 shows a side view of the various layers that are used to make up each marker used with the infrared vehicle marker system.
Figure 3:
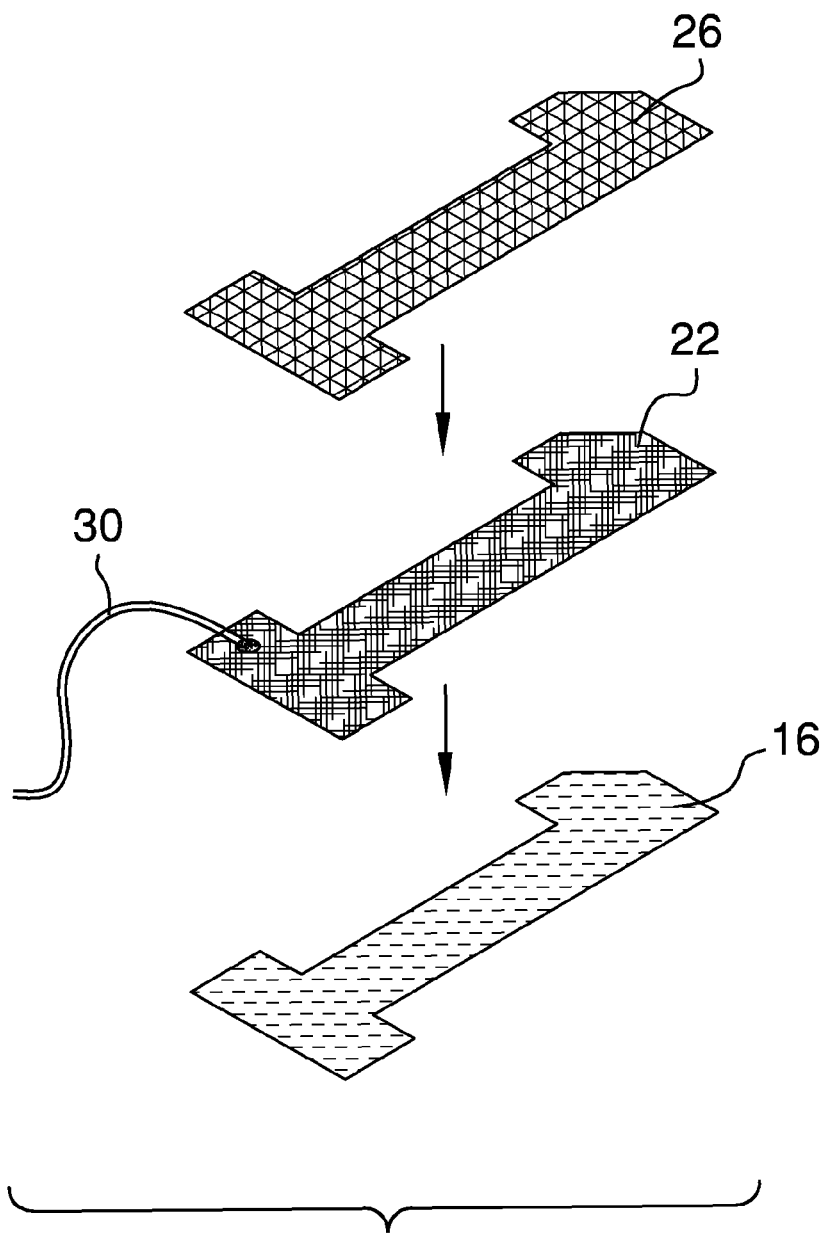
FIG. 3 shows a upper perspective view of the various layers that are used to make up each marker used with the infrared vehicle marker system.
Figure 4:
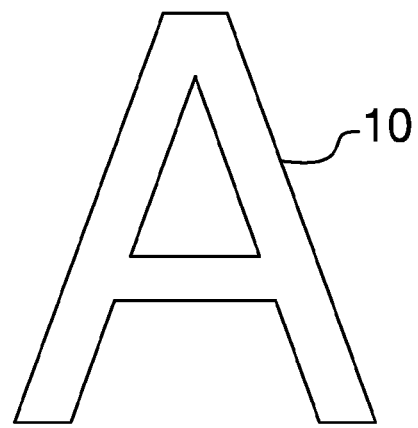
FIG. 4 shows a marker in the representative form of a letter.
Figure 5:
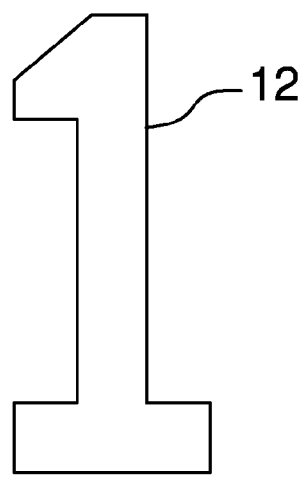
FIG. 5 shows a marker in the representative form of a number.
Figure 6:
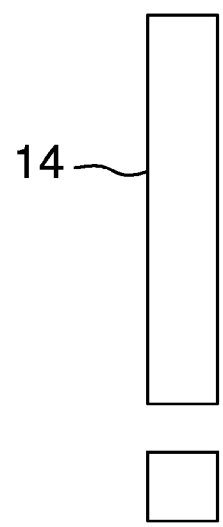
FIG. 6 shows a marker in the representative form of a symbol.

With reference now to the drawings, and in particular to FIGS. 1 through 3 thereof, an infrared vehicle marker system 2 embodying the principles and concepts of the present invention and generally designated by the reference numeral 2 will be described.

As best illustrated in FIGS. 1 through 3, the infrared vehicle marker system 2 comprises at least one marker 4 that is sized at least twenty-two inches in height. The marker 4 is preferably placed on the rear deck lid or roof 6 of a ground-based vehicle 8 so that it can be readily observed from an aerial vehicles 38, such as helicopters, military aircraft, and the like. Marker 4 preferably is designed to have the shape and form of a letter 10, a number 12, or a symbol 14.

The marker 4 itself is fabricated from three different layers of material. The innermost layer 16, or what could be termed the "bottom layer," is preferably a double-sided foil 18. In the alternative, the bottom layer could also be fabricated from an aluminized Mylar backing 20. This bottom layer 16 is the layer that is placed into direct contact with the vehicle 8 on which the infrared vehicle marker 2 is located.

The middle layer 22 is directly attached to the bottom layer 16 and is fabricated from a flexible and electrically resistant heating material 24. The top layer 26, directly attached to the middle layer 22, is fabricated from a reflective material 28 that is also flexible in nature. All three layers are laminated together, with the middle layer 22 being connected via a wire 30 to power means 32 within the vehicle 8. The power means 32 preferably comprises a twelve-volt direct current power connection originating from a vehicular battery 34 located within the vehicle 8.

When the marker 4 is connected to the power means 32 and the vehicle 8 is in operation, the power means 32 will cause the middle layer 22, and thus the entire marker 4, to heat up. This heat is capable of being read by forward-looking infrared vision equipment 36 that would be placed on an aerial vehicle 38. Although the aerial vehicle 38 represented in the accompanying figures includes a helicopter, other aerial vehicles 38 that the equipment 36 could be located on would include military aircraft and smaller civilian aircraft as well. The aerial vehicle 38, through use of the equipment 36, would be able to read the actual marker 4 based on the shape of the heat coming off of it, and through this learned knowledge, would be able to determine if the ground-based vehicle 8 is "friend or foe."

Although civilian uses are present for use of the infrared vehicle marker 2, the marker 4 has more important uses for military campaigns in which pilots must make split-second decisions in deciding whether to bomb or otherwise target ground-based vehicles 8. Use of the marker 2 can help reduce so-called "friendly fire" incidents in which pilots accidentally bomb individuals who are on the same side of a particular military operation or conflict because the pilot would be able to use his equipment to read the marker 4 on each particular vehicle 8 prior to engaging. As a result, use of the infrared vehicle marker 2 in an ongoing, sustained campaign would help save lives and improve overall efficiency (especially military efficiency).

With respect to the above description then, it is to be realized that the optimum dimensional relationships for the parts of the present vehicle air freshener device to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. An infrared vehicle marker system comprising
   a marker;
   an object on which the marker is placed;
   means for aerially detecting the marker;
   wherein the object on which the marker is placed further comprises
      a ground-based vehicle, the ground-based vehicle comprising a rear deck lid or a roof;
      wherein the marker is placed on the ground-based vehicle by placing the marker on either the rear deck lid or a roof of the ground-based vehicle;
   wherein each marker comprises three layers;
   wherein each marker has a height of at least twenty-two (22) inches;
   wherein the three layers within each marker further comprise
      an inner layer, wherein the inner layer is the layer being attached to the vehicle;
      a middle layer attached to the inner layer;
      a top layer attached to the middle layer;
   wherein the middle layer is fabricated from an electrically-resistant heating material, said material being flexible;
   wherein the top layer is fabricated from a reflective material, said reflective material being flexible.

2. An infrared vehicle marker system according to claim 1 wherein the means for aerially detecting the marker further comprises
   (a) an aerial vehicle,
   (b) power means located within the ground-based vehicle,
   (c) means for connecting the power means located within the ground-based vehicle to the middle layer of a marker attached to the ground-based vehicle, whereby an amount of heat is generated within the middle layer of the marker located on the ground-based vehicle, and
   (d) means for detecting the heat generated within the middle layer of the marker located on the ground-based vehicle from the aerial vehicle.

3. An infrared vehicle marker system according to claim 2 wherein the power means located within the ground-based vehicle further comprises a vehicular battery.

4. An infrared vehicle marker system according to claim 3 wherein the means for connecting the power means located within the ground-based vehicle to the middle layer of a marker attached to the ground-based vehicle further comprises
   (a) at least one wire,
   (b) wherein the wire is connected to the vehicular battery, further wherein the wire is connected to the middle layer of a marker attached to the ground-based vehicle.

5. An infrared vehicle marker system according to claim 4 wherein the means for detecting the heat generated within the middle layer of the marker located on the ground-based vehicle from the aerial vehicle further comprises
   (a) an amount of forward-looking infrared vision equipment located within the aerial vehicle,
   (b) wherein the forward-looking infrared vision equipment is capable of reading and analyzing each marker of the infrared vehicle marker system by detecting the heat coming off of each marker through the heat generated by the middle layer of each marker, thereby allowing forward-looking infrared vision equipment to read each marker of the infrared vehicle marker system.

6. An infrared vehicle marker system according to claim 5 wherein at least one marker of the infrared vehicle marker system further comprises a letter.

7. An infrared vehicle marker system according to claim 5 wherein at least one marker of the infrared vehicle marker system further comprises a number.

8. An infrared vehicle marker system according to claim 5 wherein at least one marker of the infrared vehicle marker system further comprises a symbol.

9. An infrared vehicle marker system comprising
   (a) a marker, wherein each marker comprises three layers, the three layers within each marker further comprising (i) an inner layer, wherein the inner layer is the layer being attached to the vehicle, (ii) a middle layer attached to the inner layer, wherein the middle layer is fabricated from an electrically-resistant heating material, said material being flexible, and (iii) a top layer attached to the middle layer, wherein the top layer is fabricated from a reflective material, said reflective material being flexible,
   (b) an object on which the marker is placed, the object further comprising (i) a ground-based vehicle, the ground-based vehicle comprising a rear deck lid or a roof, (ii) wherein the marker is placed on the ground-based vehicle by placing the marker on either the rear deck lid or a roof of the ground-based vehicle, and
   (c) means for aerially detecting the marker, said means further comprising (i) an aerial vehicle, (ii) power means located within the ground-based vehicle, said power means further comprising a vehicular battery (iii) means for connecting the power means located within the ground-based vehicle to the middle layer of a marker attached to the ground-based vehicle, whereby an amount of heat is generated within the middle layer of the marker located on the ground-based vehicle, said means further comprising (1) at least one wire, (2) wherein the wire is connected to the vehicular battery, further wherein the wire is connected to the middle layer of a marker attached to the ground-based vehicle, and (iv) means for detecting the heat generated within the middle layer of the marker located on the ground-based vehicle from the aerial vehicle, said means further comprising (1) an amount of forward-looking infrared vision equipment located within the aerial vehicle, (2) wherein the forward-looking infrared vision equipment is capable of reading and analyzing each marker of the infrared vehicle marker system by detecting the heat coming off of each marker through the heat generated by the middle layer of each marker, thereby allowing forward-looking infrared vision equipment to read each marker of the infrared vehicle marker system.

10. An infrared vehicle marker system according to claim 9 wherein at least one marker of the infrared vehicle marker system further comprises a letter.

11. An infrared vehicle marker system according to claim 9 wherein at least one marker of the infrared vehicle marker system further comprises a number.

12. An infrared vehicle marker system according to claim 9 wherein at least one marker of the infrared vehicle marker system further comprises a symbol.

\* \* \* \* \*